United States Patent
Sendt

[15] 3,644,110
[45] Feb. 22, 1972

[54] GLASS-MAKING TOOL AND METHOD OF USE

[72] Inventor: Alfred Sendt, Gutersloh, Germany
[73] Assignee: Firma Hermann Heye, Obernkirchen, Allee, Germany
[22] Filed: Mar. 5, 1970
[21] Appl. No.: 16,755

[30] Foreign Application Priority Data

Mar. 18, 1969 Germany ..................P 19 13 579.6

[52] U.S. Cl. ..................................65/137, 65/265, 65/319, 65/356
[51] Int. Cl. ..................................................C03b 11/12
[58] Field of Search ..........................65/265, 319, 356, 137

[56] References Cited

UNITED STATES PATENTS

| | | | |
|---|---|---|---|
| 3,224,860 | 12/1965 | Stinnes | 65/319 |
| 3,171,731 | 3/1965 | Barger et al. | 65/356 X |
| 3,258,324 | 6/1966 | Torok | 65/356 X |

FOREIGN PATENTS OR APPLICATIONS

491,846 9/1938 Great Britain ..........................65/356

Primary Examiner—Arthur D. Kellogg
Attorney—Michael S. Striker

[57] ABSTRACT

In a glass-making method and a tool involved in carrying out the method, the tool is subjected to heating. The invention provides for controlling the temperature of the tool by providing the latter with at least one internal chamber and accommodating therein a vaporizable volatile heat-exchange medium which is evaporable in the chamber in one region thereof as a result of the heating of the tool, moves to another cooler region where it becomes condensed, and is returned to the one region by capillary means accommodated in the chamber.

20 Claims, 16 Drawing Figures

PATENTED FEB 22 1972

INVENTOR
ALFRED SENOT

INVENTOR
ALFRED SENGT

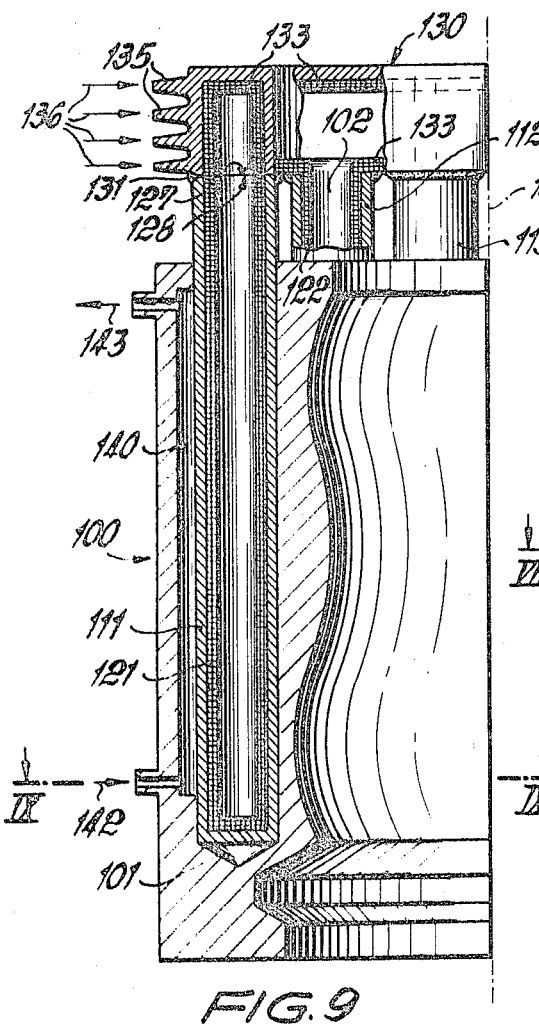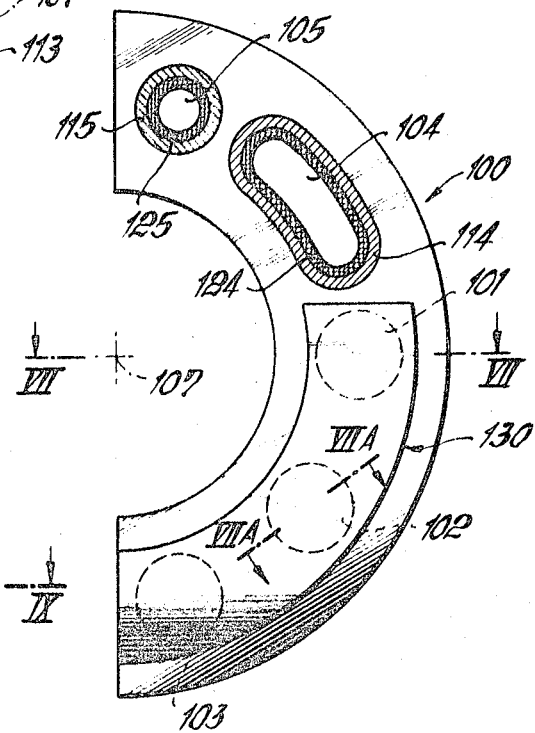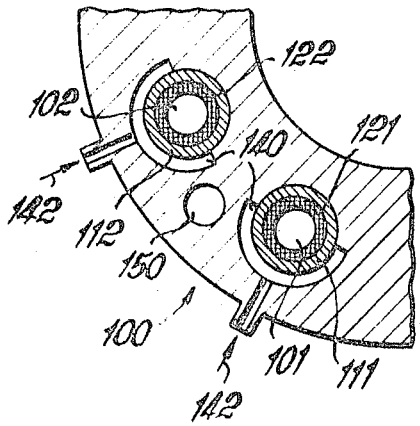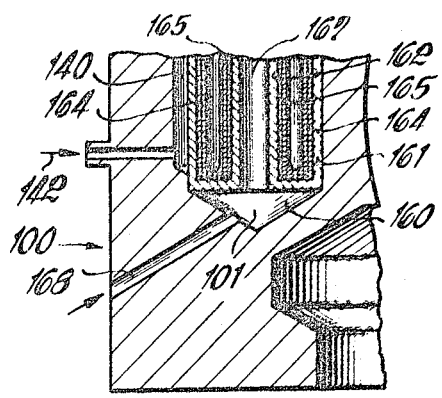

INVENTOR
ALFRED SENDT

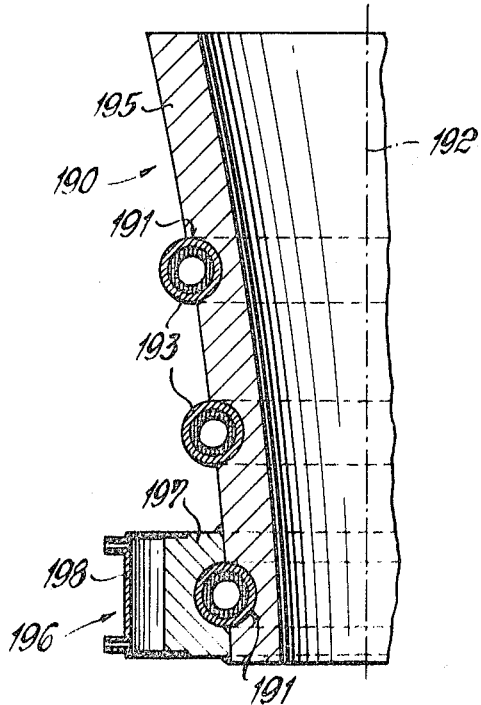
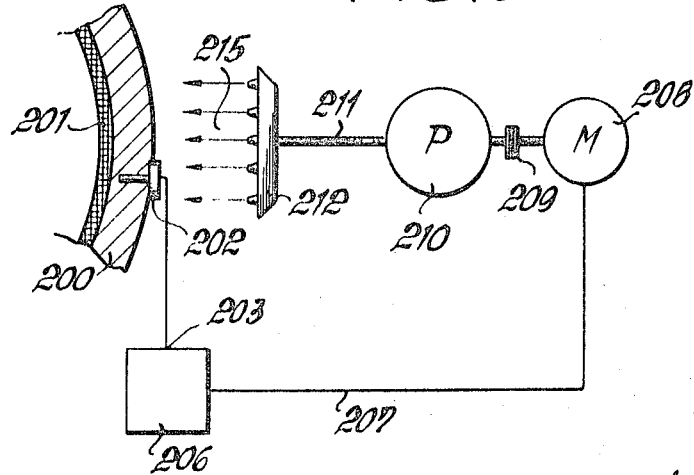

GLASS-MAKING TOOL AND METHOD OF USE

BACKGROUND OF THE INVENTION

The present invention relates generally to glass making, and more particularly to tools involved in glass making. Still more specifically the invention relates to a tool involved in the glass-making process and to a method of influencing the temperature of such tool.

The making and processing of glass is well known and need not be described as such. However, for an understanding of the invention it must be pointed out that in the manufacture and processing of glass, particularly of hollow glass such as bottles, hollow building blocks of glass, television picture tubes and the like, the rapid and controlled exchange of heat is exceedingly important. It is necessary, in particular, that the temperature of the tools involved in the making and processing of glass be controlled in such a manner so as to be maintained at a temperature range which is most advantageous for the manufacturing process. This temperature range is generally closely below the so-called adhesion temperature at which the glass tends to adhere to the tool and thereby causes damage to whatever glass article is to be produced with the tool. The temperature of the tool must therefore not be allowed to exceed this optimum temperature range and reach the adhesion temperature. On the other hand, the temperature of the tool must not be allowed to drop below the optimum temperature range because this also causes quality deficiencies in the glass article inasmuch as the surface of the article in this case can assume a so-called "hammered," namely rough and optical by disadvantageous appearance.

The answer to maintenance of the tool temperature at the optimum range is of course to effect controlled heat exchange in such a manner that the heat imparted to the tool by the hot glass be withdrawn from the tool, and that this be done with the maximum possible amount of regulation to permit adaptation to changing operating circumstances.

This is by no means a new realization and, accordingly, attempts have been made previously to arrive at the desired results. They have not, however, heretofore been successful. The predominantly used approach to the problem is to cool the tools by means of air which is for instance blown against the tool through air jets supplied by high volume blowers. If the cooling effect afforded in this manner can be regulated at all, it is manually which is of course not satisfactory. It is also known to provide the tools with cooling ribs or fins to increase the cooling effect, and locally different cooling effects have been obtained by suitable configuration of the ribs and the addition of air guide means.

Another approach known from the prior art deals with the cooling of rams or plungers used in the making of glass articles. In this case air nozzles are arranged in the hollow interior of the ram and cooling air is blown into the latter. Again, however, this has not been successful, particularly not with the necessary reliability and under all operating conditions. In this connection it must be pointed out that the cooling of rams in the glass making or producing process is a critical factor, especially when the rams are used to produced glass bodies having small diameter necks.

A further consideration in the making of glass is the requirement that there be maximum thermal homogeneity—that is evenness of temperature—over the tool surface coming in contact with the glass. It is well known that if the tool surface has different temperatures at different locations the resulting glass product made with such a tool is inferior. This is true irrespective of whether the temperature of the tool surface locally drops below the optimum temperature range or locally exceeds this range.

Again, attempts have been made to overcome this problem. One such attempt comprises an undivided preform which is lifted off after the parison is formed and which is concentrically surrounded by a cylinder into which the cooling air is introduced. However, it is virtually impossible to obtain with such a construction the desired thermal homogeneity of the tool surface facing and contacting the glass, particularly within the relatively narrow limits which must be maintained under modern manufacturing conditions, especially in the production of relatively thin-walled hollow glass articles.

An additional disadvantage of air cooling is the fact that is is very noisy, with the noise level at times reaching the tolerance limit of the operating personnel. In addition, the air cooling of the tools is relatively expensive, not the least because of the poor cooling efficiency afforded by air under the particular circumstances here involved. A further disadvantage is, of course, the fact that the known air-cooling arrangements require valuable space.

An obvious alternative to cooling with air is the use of water for cooling purpose. Being obvious, this possibility has been proposed and tried. It is limited in its applicability, and requires rather elaborate and expensive installations which make this cooling method unsuitable in many if not most cases.

The present invention departs from these approaches and makes use of a cooling concept the basic details of which were disclosed—albeit in another context—in U.S. Pat. No. 2,350,348.

SUMMARY OF THE INVENTION

It is, accordingly an object of the present invention to overcome the aforementioned disadvantages.

More particularly it is an object of the present invention of providing an improved method of controlling the temperature of i.e., cooling or warming—glass-making tools in such a manner as to afford reliable maintenance of such tools at the optimum operating temperature range.

An additional object of the present invention is to provide such a method which results in thermal homogeneity of the glass-contacting tool surface or surfaces within desired narrow limits.

A concomitant object of the invention is to provide such a method which permits an increase in the production speed due to precisely controllable temperature conditions.

Still another object of the invention is to provide tools for carrying out the novel method.

In pursuance of the above objects, and others which will become apparent hereafter, one feature of the invention resides, briefly stated, in accommodating a volatile vaporizable heat-exchange medium in an internal chamber of a glass-making tool which is exposed to elevated temperatures, and controlling the temperature of the tool as a function of successive evaporation of the medium in one region of the chamber, condensation of the evaporated medium in another region of the chamber, and returning of the thus-condensed medium by capillary action from the other region to the one region of the chamber.

Thus, the temperature control takes place in a closed system. The circulation of the heat-exchange medium is widely independent of gravitational forces and results exclusively as a function of a prevailing temperature differential. The capillary means is saturated with the heat-exchange medium which evaporates in the region of elevated temperatures with the vapor flowing in the direction of temperature drop, that is towards the region of lower temperature, where it then condenses. The condensate is transported back by capillary action via the capillary means to the region of higher temperature. With such a system for control of the temperature of glass-making tools is not only entirely self-maintaining but the tool temperature can be maintained precisely within narrow limits. Of course, the system permits not only cooling but also heating of the tool, for instance in the region of neck, or wall and bottom portions which are at a temperature below the optimum operating temperature. The system further affords a self-regulating thermal homogeneity of the tool surface within a very narrow limit, thus meeting the earlier-mentioned requirement in this respect.

According to one embodiment of a tool according to the present invention there is provided at least one enclosed chamber accommodating a liquid evaporable heat-exchange medium and capillary means for returning condensed heat-exchange medium—or for assisting such return—to one or several evaporation regions of the chamber. By cooling a single zone of the wall bounding the chamber a very quick regulation of the operating temperature can be achieved with such a tool, at high thermal homogeneity of the tool surface.

A further embodiment of the invention envisions control of the temperature of the outer surface of the wall bounding the chamber in one or several condensation regions, thus permitting the wall thickness to be relatively thin and affording the tool designer great freedom in the tool construction. It is advantageous that the temperature control for each condensation region be effected by a temperature control device which may be controllable and/or regulatable, for instance an air blower or a water jacket. The positioning of the condensation regions with reference to the overall configuration of the tool is entirely within the purview of the tool designer. In the condensation regions the outer wall bounding the chamber may be provided with e.g., fins or the like for increasing the effectiveness of the temperature control device. Each such device may be controllable or regulatable by a regulating device whose operation is effected by a function of the temperature of the respective condensation region as sensed by a thermal sensor. It is particularly advantageous in this context that thermal sensing is necessary only at a single location of the tool, and not for every condensation region although this latter is of course possible if desired, because the temperature of the entire outer surface bounding the chamber is sufficiently uniform everywhere, as mentioned before.

Particularly advantageous operating circumstances are obtained if the inner surface of the interior chamber—of which there may of course be more than one—is provided with the capillary means. The remaining hollow space of the chamber serves as a flow path for the vapor resulting from evaporation of the heat-exchange medium, which vapor moves from the evaporation region of high temperature to the condensation region of lower temperature.

In accordance with an additional embodiment of the invention it is possible to provide one or more discrete capsules each of which encloses an interior chamber containing the heat-exchange medium and the capillary means, and to connect such capsule or capsules with the tool which is to be tempered. This of course has the advantage that one or more such capsules can be used wherever desired at a given tool, so that it is entirely up to the operator whether he wishes—in dependence upon prevailing requirements—to create locally different temperature conditions on the tool. In addition such capsules can of course be readily exchanged or removed—for instance if the tool itself is worn or damaged—for reuse with another tool.

A temperature profile at a tool can be achieved by inserting each such capsule completely or partially into a recess provided for this purpose in the tool, and the temperature profile may for instance be varied by varying the depth to which the capsules are inserted into such recesses.

The temperature profile can be further influenced in the manner in which thermal coupling is effected between the tool or capsule or capsules. Thus, the capsule or capsules may for instance be connected thermally with the tool be means of solder which is either liquid or solid at the tool operating temperature.

According to a particular embodiment of the invention the capsules may be provided with openings which are fluidtightly connected with complementary openings provided in a connecting conduit which latter also contains capillary means connected with the capillary means in the capsules through the openings. In this manner uniform temperature is obtained for all capsules connected with the conduit. Of course, the temperature of each capsule may be controlled by means of one or several temperature devices in the aforementioned sense, located either within or without the tool body.

Excessive temperature differentials can be avoided by interposing between capsule and control device a thermally retarding, thermally storing or thermally distributing medium, for instance in form of a metallic jacket which is connected with the capsules in thermally conductive manner. This avoids excessive temperature differentials between control device and outer wall of the capsule.

Thermal uniformity is improved if at least a portion of the inner surface bounding the respective chamber extends in parallelism or at least substantial parallelism with the tool surface which is to be tempered.

According to an additional embodiment of the invention the capillary means within the chamber may consist of two or more capillary elements consisting of capillary material which are connected by bridging portions also of capillary material. These bridging portions not only serve to reinforce the chamber—which usually is under overpressure—and to maintain the chamber walls at predetermined spacing from one another but also to reduce the flow path for the condensate and therefore to speed up the transportation of the condensate through the chamber.

One or more of the chambers may be elongated in direction transversely to, especially normal to the axis of the tool. In this case it is possible to obtain within the respective planes identical and uniform temperature conditions, but to obtain different temperature conditions in different planes. This is for instance desired for certain areas of hollow glass bodies, for instance in the transition region between the circumferential wall and the bottom wall of such a glass body.

A ram or plunger constructed according to the present invention is completely hollow and provided with a depression which is tightly connected with the inner wall and whose outer side is arranged to be cooled by a suitable cooling device, whereas its inner side is provided with capillary means which is connected with the capillary means on the inner surface bounding the hollow interior. In this manner the cooling device requires little or no extra space outside the contour of the ram. THe cooling device may have a cooling chamber for the cooling medium which cooling chamber is partially bounded by the outer side of the indentation or recess. This outer side is then in contact with a directed flow of the cooling medium so that a good heat exchange is assured.

A form or mold, or part of such a form or mold which is constructed according to the present invention may be double-walled with the walls defining between themselves the interior chamber. This is particularly advantageous from a manufacturing point of view and an approach which can be used for undivided forms, forming form halves which are suspended from forming tongs and forming bottoms.

Finally, the invention also provides for connecting the chambers of different sections of a multisection form by means of a flexible fluidtight conduit containing the capillary means. In this manner regulation and uniform setting of the temperature of several tools—a form or sections of a form are of course also tools—is possible. Of course, individual rigid conduits may also extend from the respective form sections and may be connected with one another via a swivel joint and in thermally conductive relationship.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 7 is a section taken on the line VII—VII of FIG. 8 and the line VIIA—VIIA also of FIG. 8;

FIG. 8 is a fragmentary end elevational view, partly in section, of the embodiment of FIG. 7;

FIG. 9 is a section on the line IX—IX of FIG. 7;

FIG. 10 is a fragmentary longitudinal section through a further embodiment of the invention;

FIG. 15 is a diagrammatic longitudinal section showing still an additional embodiment; and FIG. 16 is a diagram showing the control of a tempering arrangement for use in accordance with the present invention.

DESCRIPTION OF THE PREFERRED EMBODIMENTS

Figure 1:
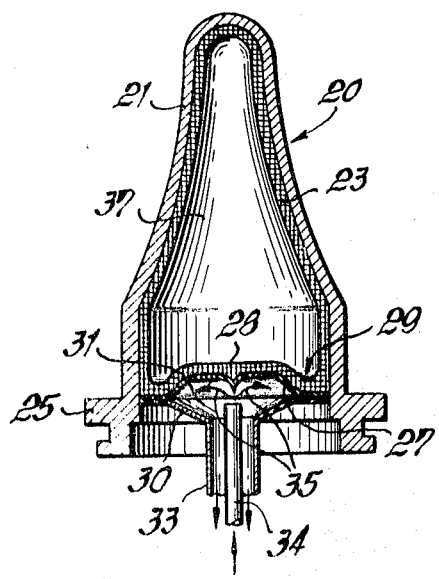
FIG. 1 is a somewhat diagrammatic longitudinal section through a tool in accordance with the present invention.

Discussing now the drawing in detail, and firstly the embodiment illustrated in FIG. 1, it will be seen that reference numeral 20 identifies a ram such as is used in the glass-making industry in the production of hollow glass bodies. SUch rams are well known to those in the art and need not be specifically described with reference to their overall construction and their employment.

The ram 20 has a circumferential wall 21 bounding an inner chamber and being provided on its inner surface with capillary means in form of an element 23 of capillary material. A coupling ring 25 is provided in the region of which an indented portion 27 is fluidtightly connected with the wall 21 at the inner side thereof, and the interior side of the indented portion 27 is also provided with capillary material 28. The materials 23 and 28 are connected in annular zone 29 with one another.

Wall means 30 is fluidtightly connected with the portion 27 or with the inner side of the wall 21, and defines with the portion 27 a guide chamber 31 for cooling medium which is supplied in the direction of the arrows 35 into the chamber 31 via the inlet conduit 34. The cooling medium escapes from the chamber 31 by means of the outlet conduit 33 which is coaxial with the inlet conduit 34. By providing the portion 27 in the illustrated indented form, a cooling surface and condensation surface for the liquid volatile evaporable heat-exchange medium accommodated in the chamber 37 of the ram 20 is obtained, whose area is larger than would be possible if the portion 27 were not indented in the illustrated manner.

Figure 2:
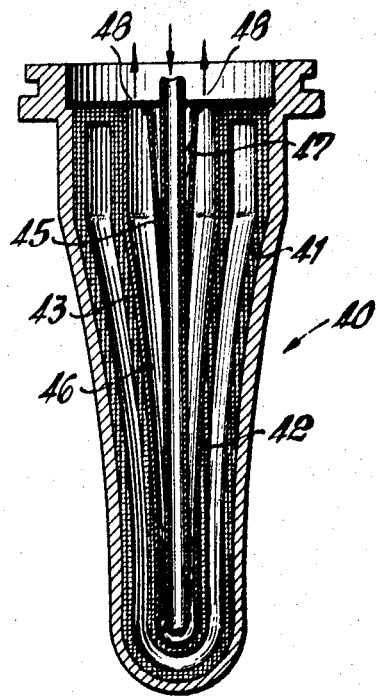
FIG. 2 is a view similar to FIG. 1 but showing an additional tool.

FIG. 2 shows a ram 40 which is used for the manufacture of hollow glass bodies having relatively narrow necks or generally openings. It will be appreciated that the narrower such openings are, the more difficult is the cooling of the ram. In FIG. 2 the inner surface of the wall bounding the chamber in the ram 20 is again covered with capillary material 41 which is connected with capillary material 42 located on the juxtaposed surface of a deep indentation 43 extending into the interior of the ram 40. The walls means 45 corresponds to the wall means 30 of FIG. 1 and follows largely the configuration of the indentation 43. It defines the cooling chamber 46 which corresponds to the chamber 31 of FIG. 1, and a central supply conduit 47 feeds cooling medium into the chamber 46 whereas one or more outlet conduits 48 permit the cooling medium to leave the chamber 46.

Figure 3:
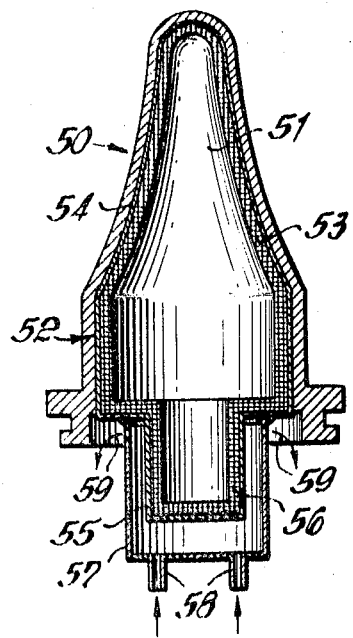
FIG. 3 is a view similar to FIG. 1 illustrating yet a further embodiment.

In the embodiment of FIG. 3 a ram is identified with reference numeral 50 and has a recess 51 into which there is inserted a fluidtight capsule 52 carrying on its interior surface the capillary material 53. Solder which may be liquid or solid at the operating temperature of the tool may be used for obtaining improved heat-exchange contact between the inner side of the circumferential wall 54 of the ram 50 and the outer side of the capsule 52. The cooling surface of the capsule 52 in the embodiment of FIG. 3 is increased by the outer projection 55 whose inner side is also covered with capillary material 56. Wall means 57 surrounds the projection 55 and receives cooling medium in the direction of the arrows 58 whereas the cooling medium is removed in the direction of the arrows 59. The cooling medium is this and in the other embodiments already described may for instance be air or water.

Figure 4:
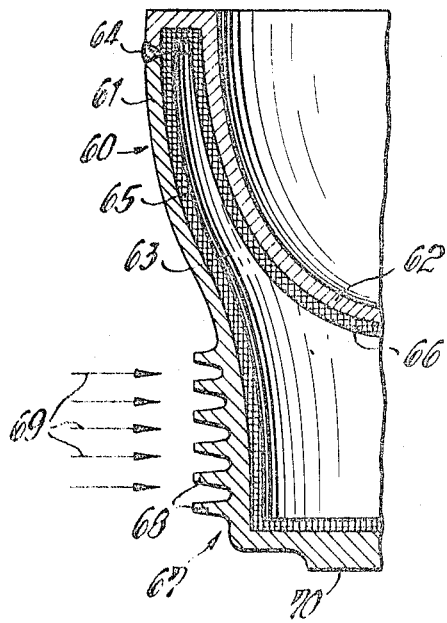
FIG. 4 is a view similar to FIG. 1 illustrating still another embodiment.

The embodiment illustrated in FIG. 4 shows an undivided preform or press form 60 having double walls 61 and 62 defining with one another a chamber 63. The walls 61 and 62 are fluidtightly connected with a welded seam 64 and covered on their juxtaposed surfaces with capillary material 65 and 66. The outer wall 61 is deformed to obtain the cup-shaped configuration 67 and provided exteriorly with cooling ribs or fins 68 onto which in the illustrated embodiment air is blown in the direction of the arrows 69. A mounting portion 70 is provided on the bottom wall of the cup-shaped portion 67.

Figure 5:
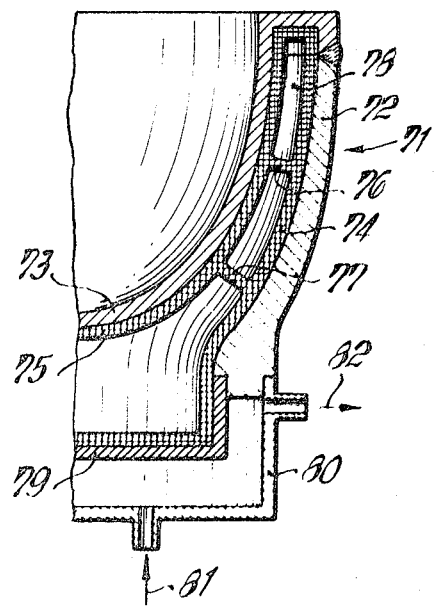
FIG. 5 is a view similar to FIG. 4 illustrating a modified embodiment.

The embodiment in FIG. 5 is analogous to that of FIG. 4. It also shows an undivided—that is one piece—preform 71 whose juxtaposed surfaces are covered with capillary material 74 and 75. Additionally, bridging portions 76 and 77 of capillary material connect the capillary material 74 and 75. The portions 76 and 77 may be of any desired cross-sectional configuration and may also extend annularly through the chamber or space 78 defined between the walls 72 and 73. A cup 79 is provided at the bottom of the outer wall 72 for increasing the temperature exchange surface when necessary. A housing or wall means 80 surrounds the cup 79 and temperature exchange medium is introduced into the housing means 80 in the direction of the arrow 81 and removed in the direction of the arrow 82.

Figure 6:
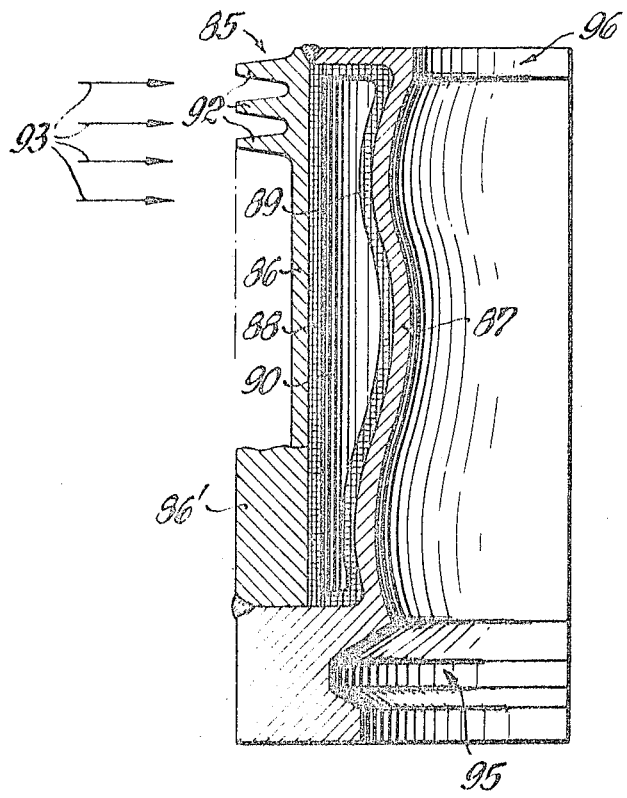
FIG. 6 is a diagrammatic longitudinal section through yet another embodiment of the invention.

The embodiment in FIG. 6 shows one-half 85 of a two-section preform. It has walls 86 and 87 defining with one another a space 90 and being provided on their juxaposed surfaces with capillary material 88 and 89. The outer wall 86 is of relatively thin construction and provided with fins or ribs 92 onto which cooling air 93 is blown. However, as indicated at 86', the outer wall may also be thicker and in this case serves a thermally retarding or thermally storing purpose. At the bottom of the section 85 there is provided a centering recess 95 for a preform bottom, and at the top at 96 there is provided space for a nonillustrated auxiliary element, e.g., one-half of a neck ring.

The embodiment of FIG. 7 is analogous to that of FIG. 6. It illustrates one-half 100 of a two-section preform. However, unlike the embodiment in FIG. 6 the embodiment of FIG. 7 is provided with a plurality of chambers or spaces, such as those identified with reference numerals 101–105 (see FIG. 8) which extend substantially parallel with the axis 107 of the form or tool. Each of these spaces accommodates a fluidtight capsule 111–115, respectively, and solder may be used in the aforementioned manner to provide improved thermally conductive contact between the respective capsules 111–115 and the inner surfaces bounding the respectively associated spaces 101–105. Each capsule is provided on its inner circumferential wall with capillary material 121–125.

In the region of their upper ends the capsules 111–113 are each provided with an opening 127 whose edge is fluidtightly connected along a seam 131 with a complementary opening 128 in a fluidtight connecting conduit 130. The latter is provided in its interior with capillary material 133 which is in contact with the capillary material in the capsules 111–113. Control of the temperature of the capsules 111–113 can be improved by ribs or fins 135 provided on the conduit 130 and against which a stream of air 136 is blown. However, temperature control of the capsules 111–113 can also be effected by forming an axial channel 140—or several such channels—in the section 100 as illustrated in FIGS. 7 and 9. In this case heat-exchange means—such as air or water—is introduced in the direction of the arrow 142 into the channel 140 and removed in the direction of the arrow 143. In addition, bores such as those identified with reference numeral 150 may be provided intermediate the individual spaces 101 and 102 as shown in FIG. 9, and these then serve to reduce the mass and weight of the tool.

Figure 13:
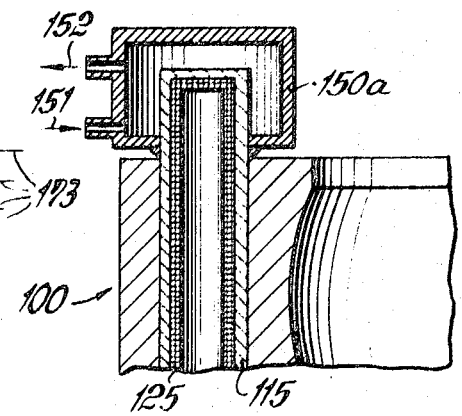
FIG. 13 is a diagrammatic longitudinal section showing yet a further embodiment.
Figure 14:
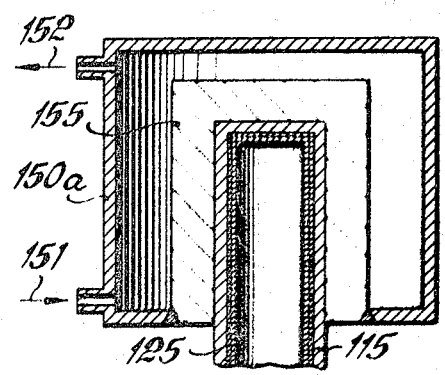
FIG. 14 is a view analogous to FIG. 13 but showing a modified embodiment.

The presence of the conduit 130 results in uniformity of temperature conditions in all capsules 111–113 which are connected with the conduit. On the other hand, the capsules 114 and 115 are not connected with the conduit but instead are fluidtightly closed instead of being provided with the openings 127, and have in usual manner in their interior the illustrated capillary material. It is pointed out that the capsules 114 and 115 may for instance project upwardly out of the section 100 and may be provided— as illustrated in FIGS. 13 and 14—at their projecting ends with a cap 150a into which a heat-exchange medium, i.e., heating or cooling medium is introduced in the direction of the arrow 151 and from which it is removed in the direction of the arrow 152. As shown in FIG. 14 the capsule 115 may be provided with a hollow metallic cylinder 155 arranged between the capsule 115 and the cap 150a. However, control of the temperature of the capsules 114 and 115 may also be effected with axial channels analogous to the channel 140 of the capsule 111.

The embodiment illustrated in FIG. 10 shows a capsule 160 which is introduced into the space 101 of a preform section 100. In this embodiment the capsule 160 comprises two coaxial cylinders 161 and 162 defining a clearance with one another and being fluidtightly connected at their opposite ends with one another. The juxtaposed surface of the cylinders 161 and 162 are covered with capillary material 164 and 165. The inner channel 167 of the inner cylinder 162 is unobstructed by the connection of the cylinders 161 and 162 at their opposite ends; a heat-exchange medium may be passed through the channel 167 in addition to or in lieu of the channel 140. Such medium is introduced through a bore 168 at the lower end of the section 100 and leaves through a conduit system which is connected at the upper end of the capsule 160 with the channel 167. The presence of the latter significantly increases the surface area of the capsule which can be brought into contact with the heat-exchange medium.

It is emphasized that the cross-sectional configuration of the capsules may be selected at will. In FIG. 10 the configuration is annular, whereas in FIG. 8 the capsule 115 is of circular cross section and the capsule 114 of substantially kidney-shaped cross section.

Figure 11:
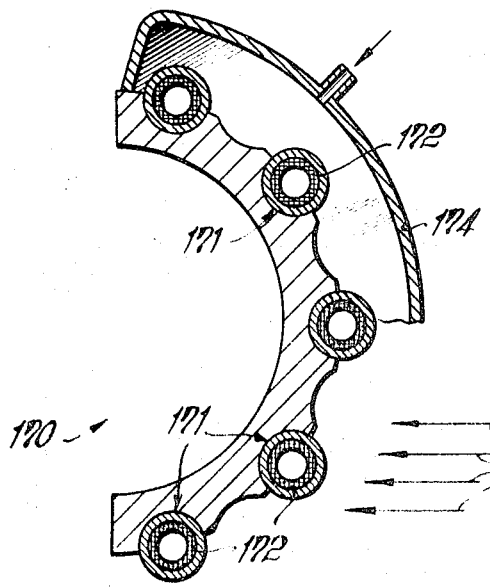
FIG. 11 is a diagrammatic cross section through a tool according to an additional embodiment of the invention.

Coming now to the embodiment illustrated in FIG. 11 it will be seen that this also shows a form section 170 which is provided in its surface with recesses 171 into which capsules 172 are partially inserted. The latter may correspond in their construction and configuration for instance to the capsule 111 of FIG. 7 or the capsule 160 of FIG. 10. Those portions of the capsules 172 which project in radial direction from the recesses 171 are exposed to a heat-exchange medium which is brought into contact with them either in form of a free stream 171 or a stream which is guided by a housing 174.

It should be emphasized here that the capsules 172 and those discussed with reference to FIGS. 7–10 may be connected with the associated tool by soldering, but may also be axially freely shiftable in the respective spaces into which they are introduced. The latter possibility has the advantage that certain portions of the tool may be selectively withdrawn from the heat control influence of the respective capsules.

Figure 12:
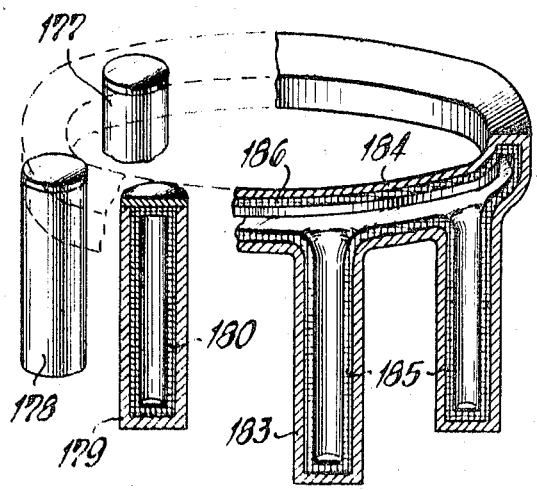
FIG. 12 is a diagrammatic perspective view illustrating still another embodiment.

Coming now to the embodiment in FIG. 12 it will be seen that at the left-hand side thereof there are illustrated three individual capsules 177–179 which are not connected with one another and which are completely enclosed and provided on their inner surfaces with capillary material, such as the material 180. FIG. 12 further shows additional capsules 183 which, however, are fluidtightly connected with a conduit 184 corresponding to the conduit which was illustrated and described in FIGS. 7 and 8 and identified therein with reference numeral 130. The capillary material 185 of these additional capsules 183 is connected with the capillary material 186 of the conduit 184. Both of the arrangements of FIG. 12 may be utilized in the embodiment of FIG. 11 and may be subsequently removed from the mold or form section 170 of FIG. 11 should the same become damaged or unusable in general. In other words, these capsules may be removed and reused independently of the tools with which they are employed at any given time.

In the embodiment of FIG. 15 a form or mold 190 is provided in its outer surface with grooves 191 extending in a plane normal to the axis 192 of the form 190. Into these grooves 191 ring-shaped capsules 193 may be inserted depending upon localized requirements and corresponding in their cross-sectional configuration for instance to the capsule 111 of FIG. 7 or the capsule 160 of FIG. 10. If the form 190 is not of one piece but consists of sections, then a capsule 193 corresponding to the one earlier identified with reference numeral 160 is particularly advantageous because of the more ready accessibility to the center channel of the capsule.

The portions of the capsule 193 which extend from the wall 195 are connected with a heat-exchange device 196 which may but need not be of annular configuration and comprises a metallic ring 196 the temperature of which is tempered by means of tempering medium guided by a housing 198.

Coming, finally, to the embodiment of FIG. 16 it will be seen that there is illustrated a control arrangement such as it may typically be used in accordance with the present invention. A capsule 200 is provided on its inner surface with capillary material 201. A temperature-sensing device 202 of conventional construction is thermally coupled with the wall of the capsule 200 and supplies signals to the input 203 of a device 206 of known construction which controls and/or regulates the operation of a motor 208 via a conductor 207. Motor 208 is connected via a coupling 209 with a blower 210 for cooling air, from which a stream of such air is conducted by a conduit 211 to a nozzle 212 which directs the air in the direction of the arrows 215 onto the surface of the capsule 200 the temperature of which is to be controlled. As already pointed out earlier, the largely uniform temperature of the wall of the capsule 200 makes it sufficient to sense the temperature only at a single location. As soon as the temperature at this location is greater than the predetermined optimum temperature which is set with the device 206, or greater than a temperature range which is set in this manner, the motor 208 is energized by the device 206 and supplies cooling air.

Of course, the device 206 may also be so programmed that the motor 208 is deenergized as soon at the optimum temperature or the optimum temperature range is reached. Naturally, the motor 208 can also be controlled in dependence upon the signals emanating from the sensor 202 and without the device 206, and it is clear that the capsule may also be heated rather than cooled in the manner illustrated in FIG. 16.

The following information will serve to facilitate an understanding of the invention.

1. Operating Temperature Range

Approximately 400°–700° C. in forms and rams of glass-working machines.

2. Constructive Details for Employment in Accordance with (1) above a. Materials suitable for wall means surrounding the chamber and for the heat-exchange medium:

| Wall means Material | Heat exchange Medium | Comments |
|---|---|---|
| V2A | Na | Na has good rising properties. |
| V2A | K | K permits lower temperatures than Na; has medium rising properties. |
| V2A | Cs | Cs has poor rising properties; permits low temperatures because of high vapor pressure. |
| Ni | K | long life |
| Steel | K | |

B. Material for the capillary means:
V2A.
c. Configuration of the capillary means:
Wire nets;
Arterial tubes, for example with sintered porous V2A wicks, particularly for capsule or chamber cross sections of other than circular configuration;
Gap or annular gap tubes. 500° C.,
3. Calculations
  a. Rise of the heat-exchange medium in an annular gap tube at 500°

| Heat-exchange medium | Cs | K | Na |
|---|---|---|---|
| Rise h. (cm.) | 13 | 55 | 95 |

For a change in the operating temperature by $\Delta t \pm 50°$ the rise distance changes only insignificantly. In continuous operation the rise distances are significantly decreased.
  b. Borderline heat-flow density in axial direction determined by reaching of sound speed:

| | Temperature | | | | | | | | |
|---|---|---|---|---|---|---|---|---|---|
| | 400° C. | | | 500° C. | | | 600° C. | | |
| Heat-transmitting medium | Cs | K | Na | Cs | K | Na | Cs | K | Na |
| $q_0[W/cm.^2]$ | 680 | 490 | ...... | 3,700 | 2,700 | 550 | 11,800 | 11,300 | 3,200 |

These densities in the present instance are limiting for the axial heat transport.

With the commercially available wire nets the capillary means cannot be operated at these optimum values.

c. Maximum evaporation heat-flow density in radial direction:

| | Temperature | | | | | | | | |
|---|---|---|---|---|---|---|---|---|---|
| | 400° C. | | | 500° C. | | | 600° C. | | |
| Heat-transmitting medium | Cs | K | Na | Cs | K | Na | Cs | K | Na |
| $q[W/cm.^2]$ | 220 | 160 | ...... | 1,180 | 870 | 180 | 2,340 | 3,680 | 1,050 |

These densities are limiting the the present instance for the radial transport.

The practically achievable radial heat-flow density for a construction using potassium as heat-exchange medium is for instance at 600° C. at 200–300 W/cm.$^2$ 4. Test Results Tools of glass-working machines are usually subject to movements. In this connection vibratory tests have shown that mechanical vibrations do not disadvantageously influence the operation of the present invention.

5. The startup to the operating temperature is no problem in any circumstance. If necessary the tool is preheated in a preliminary operation.

It will be understood that each of the elements described above, or two or more together, may also find a useful application in other types of constructions differing from the types described above.

While the invention has been illustrated and described as embodied in a glass-making tool, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A tool for contacting hot glass comprising, in combination, wall means enclosing at least one internal chamber and being subject to external heating by contact with molten glass; a supply of vaporizable volatile heat-exchange medium provided in said chamber and being evaporable by heat in at least one relatively hot first region of said chamber and condensable in at least one relatively cool second region of said chamber; and capillary means for transporting by capillary action condensed heat-exchange medium from said second region to said first region of said chamber.

2. In a method of working hot glass wherein a hollow tool is exposed to molten glass, the steps of confining in the interior of a chamber of said tool a supply of volatile vaporizable heat-exchange medium; subjecting at least one first region of said chamber to an elevated temperature at which said heat-exchange medium evaporates and maintaining at least one second region of said chamber at a lower temperature at which the thus-evaporated heat-exchange medium undergoes condensation; and conveying the thus-condensed heat-exchange medium from said second region to said first region by capillary action.

3. A tool as defined in claim 1, said wall means having an outer surface; and further comprising means for controlling the temperature of said outer surface at least in the vicinity of said second region so as to facilitate condensation of said medium.

4. A tool as defined in claim 3; further comprising regulating means for regulating operation of said control means.

5. A tool as defined in claim 3; further comprising regulating means for regulating operation of said control means as a function of the temperature of said wall means.

6. A tool as defined in claim 1, said wall means having an inner surface bounding said chamber, and said capillary means comprising a capillary structure provided on said inner surface.

7. A tool as defined in claim 1, said wall means constituting a discrete capsule; and said tool further comprising a tool body; and connecting means connecting said capsule with said tool body in thermally conductive relationship.

8. A tool as defined in claim 7; further comprising a pair of coaxial hollow cylinders arranged in said chamber and having juxtaposed major surfaces defining a clearance with one another, said cylinders having spaced ends; connecting means connecting said ends with one another while leaving unobstructed the central passage of the inner one of said cylinders; and wherein said capillary means comprises a capillary structure provided in said clearance on said juxtaposed major surfaces.

9. A tool as defined in claim 7, said tool body having a hollow dimensioned to at least in part accommodate said capsule therein.

10. A tool as defined in claim 7, said connecting means being solder which is solid at the operating temperature of said tool.

11. A tool as defined in claim 7, said connecting means being solder which is liquid at the operating temperature of said tool.

12. A tool as defined in claim 7, said capsule having an opening; further comprising at least one additional capsule similar to the first-mentioned capsule and also having an opening; and fluidtight conduit means also accommodating capillary means and having a pair of apertures in sealing relationship with the respective openings and through which said capillary means in said conduit means is connected with said capillary means in said capsules.

13. A tool as defined in claim 7; further comprising means associated with said discrete capsule for controlling the temperature means thereof.

14. A tool as defined in claim 13, wherein said control means is arranged within said capsule.

15. A tool as defined in claim 13, wherein said control means is arranged without said capsule.

16. A tool as defined in claim 13; further comprising thermally conductive means interposed between and connecting said capsule and said control means.

17. A tool as defined in claim 1, said capillary means comprising at least two elements of capillary material located within said chamber but spaced from one another; and bridging portions of said capillary material connecting said elements with one another.

18. A tool as defined in claim 1, said tool being a ram having a hollow interior which constitutes said chamber, and said wall means comprising a wall portion recessed inwardly into said chamber and having an inner side and an outer side; cooling means for cooling said outer side; and wherein said capillary means comprises a first element of capillary material on an inner surface bounding said chamber, and a second element of capillary material on said inner side and connected with said first element.

19. A tool as defined in claim 1, said tool being a mold element comprising a double wall one of which constitutes said wall means, and which define with one another said internal chamber.

20. A tool as defined in claim 19; further comprising an additional mold element similar to the first-mentioned mold element; fluidtight flexible conduit means communicating with the internal chambers of both of said mold elements; and additional capillary means accommodated in said conduit means.

* * * * *